United States Patent
Lee et al.

(10) Patent No.: US 6,934,427 B2
(45) Date of Patent: Aug. 23, 2005

(54) HIGH DENSITY INTEGRATED OPTICAL CHIP WITH LOW INDEX DIFFERENCE WAVEGUIDE FUNCTIONS

(75) Inventors: Kevin K. Lee, Cambridge, MA (US); Desmond R. Lim, Cambridge, MA (US)

(73) Assignee: Enablence Holdings LLC, Greenville, SC (US)

( * ) Notice: Subject to any disclaimer, the term of this patent is extended or adjusted under 35 U.S.C. 154(b) by 225 days.

(21) Appl. No.: 10/095,497

(22) Filed: Mar. 12, 2002

(65) Prior Publication Data

US 2003/0174925 A1 Sep. 18, 2003

(51) Int. Cl.⁷ .............................. G02B 6/12; G02B 6/42
(52) U.S. Cl. .......................................... 385/14; 385/31
(58) Field of Search ..................................... 385/14, 31

(56) References Cited

U.S. PATENT DOCUMENTS

| | | | |
|---|---|---|---|
| 4,412,722 A | 11/1983 | Carnevale et al. | 350/96.31 |
| 4,725,110 A | 2/1988 | Glenn et al. | 350/3.61 |
| 5,148,317 A | 9/1992 | Foresi | 359/566 |
| 5,158,908 A | 10/1992 | Bionder et al. | 437/129 |
| 5,199,092 A | 3/1993 | Stegmueller | 385/50 |
| 5,222,167 A | 6/1993 | Jean et al. | 385/45 |
| 5,229,883 A | 7/1993 | Jackson et al. | 359/569 |
| 5,287,427 A | 2/1994 | Atkins et al. | 385/124 |
| 5,343,542 A * | 8/1994 | Kash et al. | 385/31 |
| 5,360,982 A | 11/1994 | Venhuizen | 385/14 |
| 5,455,878 A | 10/1995 | Thaniyavarn | 385/16 |
| 5,563,970 A | 10/1996 | Little et al. | 385/42 |
| 5,577,141 A | 11/1996 | Adar et al. | 385/43 |
| 5,600,483 A | 2/1997 | Fan et al. | 359/344 |
| 5,629,999 A | 5/1997 | Henry et al. | 385/43 |
| 5,668,900 A | 9/1997 | Little et al. | 385/37 |
| 5,682,401 A | 10/1997 | Joannopoulos et al. | 372/96 |

(Continued)

FOREIGN PATENT DOCUMENTS

| | | |
|---|---|---|
| EP | 0 473 362 A2 | 8/1991 |
| EP | 0 726 476 A1 | 8/1996 |
| EP | 0 829 119 B1 | 12/2001 |
| WO | WO 97/44870 | 11/1997 |
| WO | WO 97/44871 | 11/1997 |
| WO | WO 98/25314 | 6/1998 |
| WO | WO 98/26316 | 6/1998 |
| WO | WO 98/53535 | 11/1998 |
| WO | WO 98/57207 | 12/1998 |

(Continued)

OTHER PUBLICATIONS

Lee et al., "Fabrication of Ultralow–loss Si/SiO2 Waveguides by Roughness Reduction," Optics Letters, vol. 26, No. 23, Dec. 1, 2001, pp 1888–1890.

Rickman et al., "Silicon–on–Insulator Optical Rib Waveguides: Loss, Mode Characteristics, Bends and Y–Junctions," IEEE Proc.–Optoelectron . . . vol. 141, No. 6, Dec. 1994 pp 391–393.

Wong et al., "Fabrication of UV–Sensitive Waveguides for Integrated Photonics Applications," Proc. SPIE vol. 4110, pp 316–321.

(Continued)

*Primary Examiner*—Akm Enayet Ullah
*Assistant Examiner*—Tina M Lin
(74) *Attorney, Agent, or Firm*—Allen, Dyer, Doppelt, Milbrath & Gilchrist, P.A.

(57) ABSTRACT

The invention features an optical chip having optical functions in large mode size waveguides. Under one aspect of the invention, the optical chip features one or more large mode field size waveguides, one or more low minimum bending radius waveguides to interconnect the large mode field size waveguides, and one or more optical functions integrated within or connected to the large mode field size waveguides.

39 Claims, 5 Drawing Sheets

U.S. PATENT DOCUMENTS

| | | | |
|---|---|---|---|
| 5,710,849 A | 1/1998 | Little et al. | 385/50 |
| 5,737,458 A * | 4/1998 | Wojnarowski et al. | 385/15 |
| 5,777,793 A | 7/1998 | Little et al. | 359/584 |
| 5,790,583 A | 8/1998 | Ho | 372/92 |
| 5,825,799 A | 10/1998 | Ho et al. | 372/92 |
| 5,838,870 A | 11/1998 | Soref | 385/131 |
| 5,841,931 A | 11/1998 | Foresi et al. | 385/131 |
| 5,878,070 A | 3/1999 | Ho et al. | 372/92 |
| 5,926,496 A | 7/1999 | Ho et al. | 372/92 |
| 5,938,811 A | 8/1999 | Greene | 65/385 |
| 5,955,749 A | 9/1999 | Joannopoulos et al. | 257/98 |
| 5,990,850 A | 11/1999 | Brown et al. | 343/912 |
| 6,009,115 A | 12/1999 | Ho | 372/92 |
| 6,052,495 A | 4/2000 | Little et al. | 385/2 |
| 6,058,127 A | 5/2000 | Joannopoulos et al. | 372/92 |
| 6,069,729 A | 5/2000 | Gill et al. | 359/245 |
| 6,078,605 A | 6/2000 | Little et al. | 372/94 |
| 6,101,300 A | 8/2000 | Fan et al. | 385/27 |
| 6,108,464 A | 8/2000 | Foresi et al. | 385/14 |
| 6,125,225 A | 9/2000 | Dianov et al. | 385/124 |
| 6,130,969 A | 10/2000 | Villeneuve et al. | 385/27 |
| 6,134,043 A | 10/2000 | Johnson et al. | 359/237 |
| 6,195,187 B1 | 2/2001 | Soref et al. | 359/114 |
| 6,198,860 B1 | 3/2001 | Johnson et al. | 385/28 |
| 6,222,973 B1 | 4/2001 | Starodubov | 385/128 |
| 6,233,381 B1 | 5/2001 | Borrelli et al. | 385/37 |
| 6,236,773 B1 | 5/2001 | Butler et al. | 385/14 |
| 6,259,847 B1 | 7/2001 | Lenz et al. | 385/131 |
| 6,293,688 B1 | 9/2001 | Deacon | 362/556 |
| 6,298,180 B1 | 10/2001 | Ho | 385/15 |
| 6,311,003 B1 * | 10/2001 | Dubey et al. | 385/130 |
| 6,326,325 B1 | 12/2001 | Dawson-Elli et al. | 501/96.5 |
| 6,341,184 B1 | 1/2002 | Ho et al. | 385/3 |
| 6,608,946 B2 * | 8/2003 | Kikuchi et al. | 385/14 |
| 2001/0000714 A1 | 5/2001 | Borrelli et al. | 385/37 |
| 2001/0002941 A1 | 6/2001 | Borrelli et al. | 385/37 |
| 2002/0034352 A1 | 3/2002 | Williams et al. | 385/16 |
| 2002/0076188 A1 | 6/2002 | Kimerling et al. | 385/132 |

FOREIGN PATENT DOCUMENTS

| | | |
|---|---|---|
| WO | WO 98/09440 | 2/1999 |
| WO | WO 99/17151 | 4/1999 |
| WO | WO 00/10040 | 2/2000 |
| WO | WO 00/17679 | 3/2000 |
| WO | WO 00/43827 A1 | 7/2000 |
| WO | WO 00/48026 | 8/2000 |
| WO | WO 00/72063 A1 | 11/2000 |
| WO | WO 00/72064 A1 | 11/2000 |
| WO | WO 00/72065 A1 | 11/2000 |
| WO | WO 01/18598 | 3/2001 |
| WO | WO 01/20379 A1 | 3/2001 |
| WO | WO 01/22139 A1 | 3/2001 |
| WO | WO 01/22141 A1 | 3/2001 |
| WO | WO 01/23955 A2 | 4/2001 |
| WO | WO 01/23955 A3 | 4/2001 |
| WO | WO 01/24243 A1 | 4/2001 |
| WO | WO 01/31387 A1 | 5/2001 |
| WO | WO 01/38905 A2 | 5/2001 |
| WO | WO 01/38910 A1 | 5/2001 |
| WO | WO 01/38915 A1 | 5/2001 |
| WO | WO 01/38921 A3 | 5/2001 |
| WO | WO 01/38921 A2 | 5/2001 |
| WO | WO 01/38922 A2 | 5/2001 |
| WO | WO 01/38923 A1 | 5/2001 |
| WO | WO 01/38924 | 5/2001 |
| WO | WO 01/38925 A1 | 5/2001 |
| WO | WO 01/45194 A2 | 6/2001 |
| WO | WO 01/48532 A2 | 7/2001 |
| WO | WO 01/59492 A2 | 8/2001 |
| WO | WO 01/61387 | 8/2001 |
| WO | WO 01/61389 A2 | 8/2001 |
| WO | WO 01/61805 A1 | 8/2001 |
| WO | WO 01/65593 A1 | 9/2001 |
| WO | WO 01/96922 A1 | 12/2001 |
| WO | WO 01/99223 A2 | 12/2001 |
| WO | WO 02/04999 A2 | 1/2002 |
| WO | WO 02/05000 A2 | 1/2002 |

OTHER PUBLICATIONS

Tyschenko et al., "Enhancement of the Intensity of Violet and Green Photoluminescence from Ge+ ion–implanted SiOxNy Films Caused by Hydrostatic Pressure During Annealing," Optical Materials, vol. 17 (2001) pp 99–102.

Ridder et al., "Silicon Oxynitride Planar Waveguide Structures for Application in Optical Communication," IEEE Journal of Selected Topics in Quantam Electronics, vol. 4, No. 6, Nov./Dec. 1998, pp 930–937.

Kashyap et al., "Laser–Trimmed Four–Port Bandpass Filter Fabricated in Single–Mode Photosensitive Ge–Doped Planar Waveguide," IEEE Photonics Technology Letters, vol. 5, No. 2, Feb. 1993, pp 191–194.

Kashyap, "Photosensitive Optical Fibers: Devices and Applications," Optical Fiber Technology, vol. 1 (1994) pp 17–34.

Bazylenko et al., "Photosensitivity of Ge–doped Silica Deposited by Hollow Cathode PECVD," Electronic Letters, Jun. 20, 1996, vol. 31, No. 13, pp 1198–1580.

Nishii, "Permanent Index Changes in Ge–SiO2 Glasses by Excimer Laser Irradiation," Materials Science and Engineering, vol. B54 (1998), pp 1–10.

Little et al., "Ultra–Compact Si–SiO2 Microring Resonator Optical Channel Dropping Filters," IEEE Photonics Technology Letters, vol. 10, No. 4, Apr. 1998, pp 549–551.

Rafizadeh, et al., "Waveguide–coupled AIGaAs/GaAs Microcavity Ring and Disk Resonators with High Finesse and 21.6–nm Free Spectral Range," Optical Letters, vol. 22, No. 16, Aug. 15, 1997, pp 1244–1246.

Foresi, "Photonic–bandgap Microcavities in Optical Waveguides," Nature, vol. 390, Nov. 13, 1997, pp 143–145.

Bilodeau, et al., "Photosensitization of Optical Fiber and Silica–on–Silicon/Silica Waveguides," Optics Letters, Jun. 15, 1993, vol. 18, No. 12, pp 953–955.

Malo et al., "Ultraviolet Light Photosensitivity in Ge–doped Silica Fibers: Wavelength Dependence of the Light–Induced Index Change," Optics Letters, Sep. 1, 1990, vol. 15, No. 17, pp 953–955.

Kohnke et al., "Silica based Mach–Zehnder add–drop Filter Fabricated With UV Induced Gratings," Electronics Letters, vol. 32, No. 17, Aug. 15, 1996, pp 1579–1580.

Heimala et al., "Thermally Tunable Integrated Optical Ring Resonator With Poly–Si Thermistor," Journal of Lightwave Technology, vol. 14, No. 10, Oct. 10, 1996, pp 2260–2267.

Popovic et al., "Micron–size Bending Radii in Silica–based Waveguides," Research Laboratory of Electronics, Massachusetts Institute of Technology, 10 pages.

Barbier, "Media for Lightwave: Erbium–doped Waveguide Amplifiers Promote Optical–Networking Evolution," website: Lightwave–fiber–optic communications, bandwidth access and telecommunicatins//lightwave.archives.printthis-.click . . ., printed Aug. 8, 2001.

Krishnaswamy et al., "Optical Properties of Strip–Loaded Er–doped Waveguides," Optical Materials, Nov. 1996, vol. 6, pp 287–292.

Cheinokov et al., "Deep High–dose Erbium Implantation of Low–loss Silicon Oxynitride Waveguides," Electronic Letters, vol. 30, No. 2, Oct. 27, 1994, pp 1850–1852.

Wong et al., "Ion–exchanged Er–Yb Codoped Phosphate Glass Optical Amplifiers," Department of Electrical Engineering, City University of Hong Kong, 2 pages.

Moerman et al., "A Review on Fabrication Technologies for the Monolithic Integration of Tapers with III–V Semiconductor Devices," IEEE Journal of Selected Topics in Quantam Electronics, vol. 3, No. 6, Dec. 1997, pp 1308–1320.

Schwander et al., "Simple and Low–loss Fibre–to–Chip Coupling by Integrated Field–Matching Waveguide IN InP," Electronic Letters, Feb. 18, 1993, vol. 29, No. 4, pp 326–328.

Brenner et al., "Integrated Optical Modeshape Adapters in InGaAsP/InP for Efficient Fiber–to–Waveguide Coupling," IEEE Photonics Technology Letters, vol. 5, No. 9, Sep. 1993, pp 1051–1056.

Suematsu et al., "Propagation Mode and Scattering Loss of a Two–Dimension Dielectric Waveguide with Gradual Distribution of Refractive Index," IEEE Transactions on Microwave Theory and Techniques, vol. MTT–20, No. 8, Aug. 1972, pp 524–531.

Augusciuk et al., "Precise Control of the Modal Number of the Low–Mode Channel Gradient Index Waveguides," SPIE, vol. 2943, pp 128–133.

Zengerle et al., "Laterally Tapered InP–inGaAsP Waveguides for Low–Loss Chip–to–Fiber Butt Coupling: a Comparison of Different Configurations," IEEE Photonics Technology Letters, vol. 7, No. 5, May 1995, PP 532–534.

Danko et al., "Index Profile of Graded–Index Channel Waveguides," Applied Optics, vol. 25, No. 9, May 1, 1986, pp 1505–1507.

Shih et al., "Graded Index Polymer Channel Waveguide Array for Backplane Optical Interconnects," SPEI Nonconducting Photopolymers and Applications, vol. 1774, 1992, pp 97–102.

* cited by examiner

HIGH DENSITY INTEGRATED OPTICAL CHIP WITH LOW INDEX DIFFERENCE WAVEGUIDE FUNCTIONS

FIELD

The present invention relates generally to an optical chip and, more generally, to an optical chip including at least one low minimum bending radius waveguide and at least one optical function in a large mode field size dielectric waveguide.

BACKGROUND OF THE INVENTION

Integrated optical chips with optical functions typically use low index difference waveguides. FIG. 1 shows a typical planar dielectric waveguide, which is an example of a two-dimensional waveguide. Low index difference waveguides, such as those used in optical chips and for the optical fiber waveguides for input to and output from optical chips, are three-dimensional versions of such planar dielectric waveguides. These low index difference waveguides 10 include a core material 12 surrounded by a cladding material 14. The core material 12 can have an arbitrary cross-section, including a circular, elliptical, square, or rectangular cross-section embedded in the cladding material 14. The index of refraction $n_1$ of the core material 12 is slightly larger than the index of refraction $n_2$ of the cladding material 14. The index difference $\Delta n$ for the index of refraction $n_1$ of the core material 12 and the index of refraction $n_2$ of the cladding material 14 ($\Delta n = n_1 - n_2$) is therefore generally very small. A useful metric is delta ($\Delta$), which is defined as $\Delta n/n_{cladding}$ for this type of waveguide, and is generally around 0.01 (1 percent) to 0.04 (4 percent), and certainly less than 0.1 (10 percent). In other words:

$$\Delta = (n_1 - n_2)/n_2 \ll 1.$$

A ray of light moving in the z direction in FIG. 1 (from left to right) is guided by total internal reflection within the core material 12 if the angle of incidence $\theta$ of the ray with respect to the interface between the core material 12 and the cladding material 14 is larger than a critical angle $\theta_c$. This critical angle $\theta_c$ equals $\sin^{-1}(n_2/n_1)$. For low index difference waveguides, due to the indices of refraction $n_1$, $n_2$, the angle of incidence $\theta$ must be large in order for total internal reflection to guide the light ray through the waveguide.

The typical optical chips having low index difference waveguides are generally large, wafer-sized chips. This large size results because the low index difference waveguides can adequately guide light only if bends in the waveguides have large radii. If small bending radii are used with these low index difference waveguides, large losses result because light is loosely confined within the core material 12. Low index difference waveguides therefore function adequately without large losses only with relatively high bending radii, and it is therefore difficult to perform optical functions in small areas using these low index difference waveguides.

The use of higher index difference waveguides reduces the minimum bending radii while maintaining adequate performance (that is, low loss), and therefore reduces the area required to perform the optical functions. The index of refraction $n_1$ of the core material 12 is significantly larger than the index of refraction $n_2$ of the cladding material 14 for such a higher index difference waveguide. Delta ($\Delta$) for a high index difference waveguide is typically at least as large as 0.1, 0.2, or 0.3. In other words:

$$\Delta = (n_1 - n_2)/n_2 \geq 0.1.$$

In such a high index difference waveguide, total internal reflection of light propagating through the waveguide is achieved for smaller angles of incidence $\theta$ for a ray of light, and the minimum bending radii for which performance is adequate is reduced.

SUMMARY OF THE INVENTION

The invention features an optical chip having optical functions in large mode size waveguides. Under one aspect of the invention, the optical chip features one or more large mode field size waveguides, one or more low minimum bending radius waveguides to interconnect the large mode field size waveguides, and one or more optical functions integrated within or connected to the large mode field size waveguides. At least one of the optical functions is a large mode size optical waveguide function. At least one of the large mode field size waveguides is used to communicate with optical devices, such as optical fibers, that are external to the optical chip. In other embodiments, a plurality of large mode size waveguides, low minimum bending radius waveguides, and optical functions in large mode size waveguides can be used. The optical function can be any structure or device that is used to generate, modify, and/or measure the amplitude, frequency, wavelength, dispersion, timing, propagation direction, and/or polarization properties of one or more light pulses. These embodiments allow large numbers of large mode size optical waveguide functions to be integrated on a single optical chip having a small footprint. According to another aspect of the invention, a single optical function is split into multiple pieces, with the pieces separated by low minimum bending radius waveguides having bends.

BRIEF DESCRIPTION OF THE DRAWINGS

FIG. 3b is a cross-sectional view of the waveguide of FIG. 3a.

FIG. 4b is a cross-sectional view of the waveguide of FIG. 4a.

DETAILED DESCRIPTION OF THE EMBODIMENTS OF THE INVENTION

The embodiments of the invention provide optical chips with low minimum bending radius waveguides used for interconnections and optical functions performed in large mode field size waveguides. Very briefly, the optical chip includes one or more large mode field size waveguides, one or more low minimum bending radius waveguides to interconnect the large mode field size waveguides, and one or more optical functions integrated within or connected to the large mode field size waveguides. At least one of the optical functions, therefore, is a large mode size optical waveguide function. At least one of the large mode field size waveguides is used to communicate with optical devices that are external to the optical chip. These external optical devices can include optical fibers or other optical chips.

Figure 1:
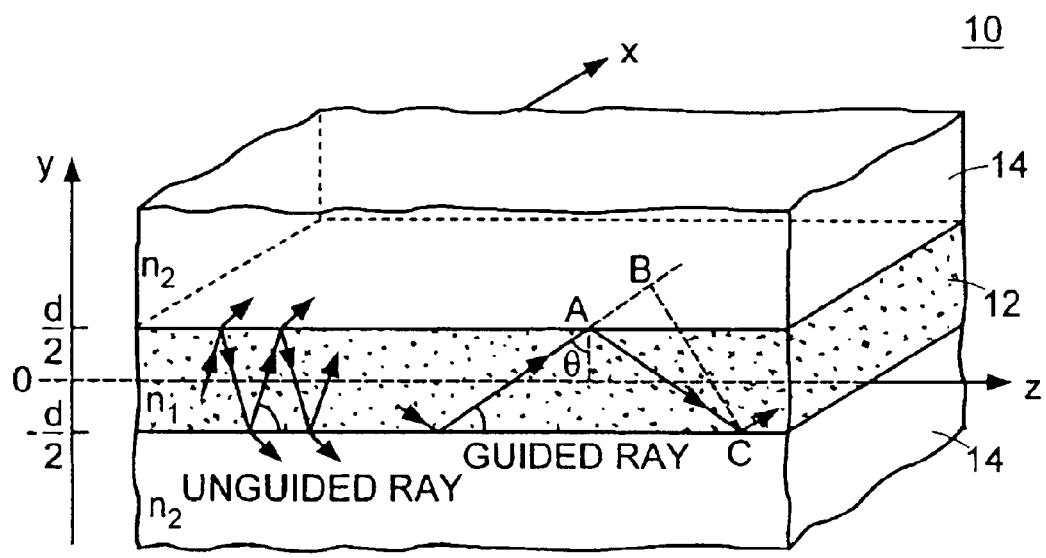
FIG. 1 is a perspective view of a prior art planar dielectric waveguide.
Figure 2:
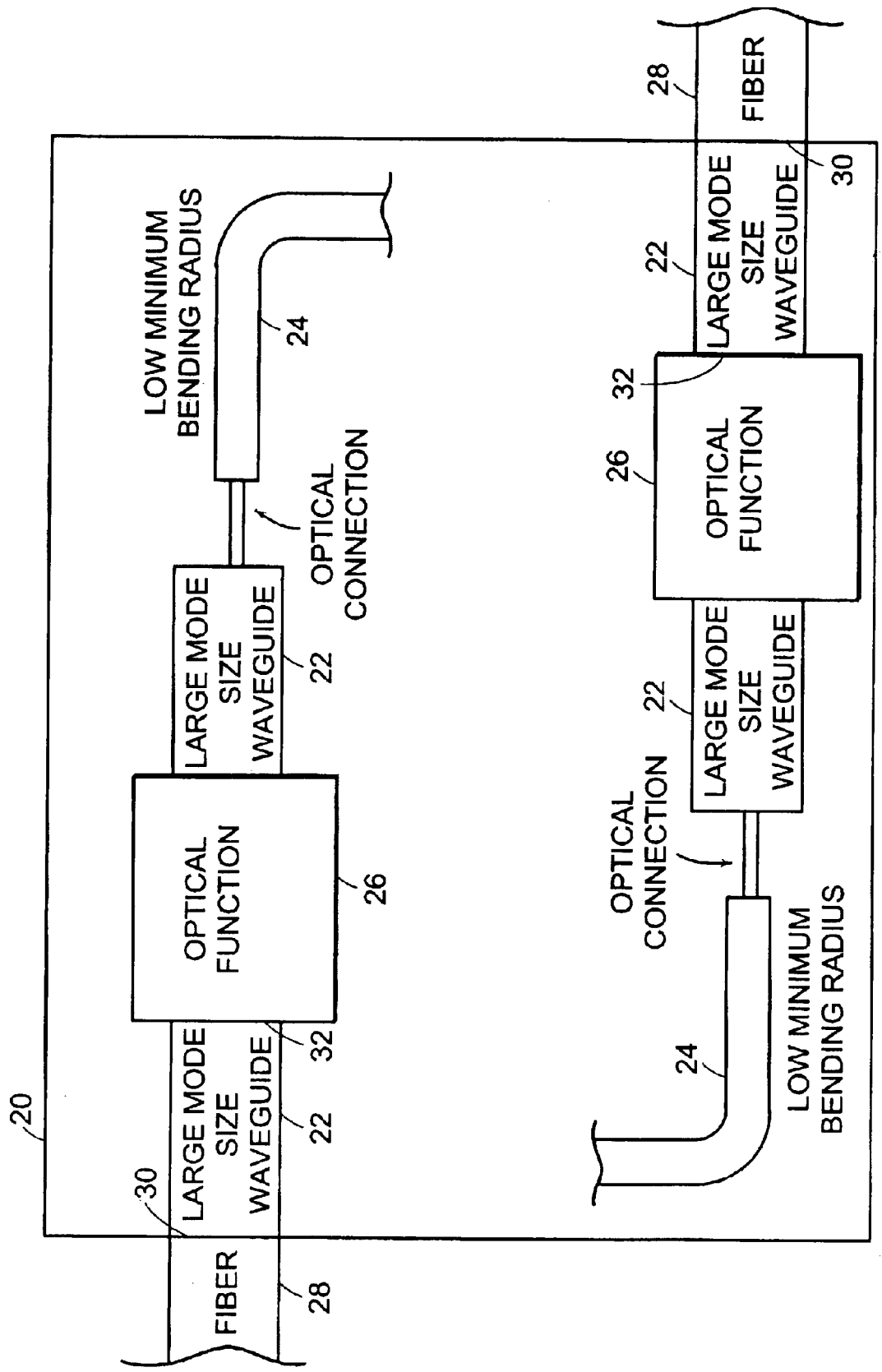
FIG. 2 is a block diagram of an optical chip according to a first embodiment of the invention.

FIG. 2 is a top view of a block diagram of an optical chip according to a first embodiment of the invention. The optical chip of FIG. 2 includes at least one large mode size waveguide 22, at least one low minimum bending radius waveguide 24, and at least one optical or electro-optical function 26 fabricated on a substrate 20. The embodiment of the optical chip of FIG. 2 depicts two low minimum bending radius waveguides 24, with each low minimum bending radius waveguide 24 being optically connected to a different large mode size waveguide 22. In addition, FIG. 2 shows an embodiment of an optical chip with two optical functions 26. In other embodiments, a single large mode size waveguide 22, a single low minimum bending radius waveguide 24, and a single optical function 26 can be disposed on the substrate 20, and in still other embodiments more than two of each of these components can be disposed on the substrate 20. FIG. 2 shows an open space between the two low minimum bending radius waveguides 24 in which, in some embodiments, addition optical functions 26, large mode size waveguides 22, and low minimum bending radius waveguides could be disposed. Any transforming device can be used to optically connect the large mode size waveguides 24 to the low minimum bending radius waveguides 22, as discussed in greater detail below.

The large mode field size waveguide 22, low minimum bending radius waveguide 24, and optical function 26 are fabricated monolithically on a single substrate 20. A number of other components can also be bonded in any manner on the substrate 20, including separate optical functions or waveguides. The substrate 20 can be made from any material, including silicon, indium phosphide, ceramic, or quartz. The substrate 20 can also be shaped in a variety of forms, including a rectangular, square, elliptical, or circular shape with a thin side profile. Generally, an optical chip includes a planar substrate 20 and patterned core materials and cladding layers that define a planar lightwave circuit (PLC) or optical circuit. At least one large mode field size waveguide 22 on the substrate 20 has a first end 30 that terminates on a side, edge, or accessible portion of the substrate 20 so that it can be connected to an external optical device, such as the optical fiber 28 shown in FIG. 2. A second end 32 of the large mode field size waveguide 22 can be optically coupled to one of the optical functions 26, as illustrated in FIG. 2, or, in other embodiments, this second end 32 could be optically coupled to one of the low minimum bending radius waveguides 24 on the substrate 20 (not shown in FIG. 2). At least one of the large mode field size waveguides 22 on substrate 20, therefore, can serve as an input/output port for the optical chip. Further, the optical chip can contain functions that change the information carrier signal from an optical signal to a different form of energy, or vice versa. Examples of alternate forms of energy that carry information include acoustic (sound/audio), radio frequency, infrared, and microwave, as well as other bands of the electromagnetic spectrum.

At least one optical function 26 is performed within or connected to one of the large mode size waveguides 22 on the substrate 20. FIG. 2 illustrates either of these embodiments with each reference to an optical function 26—e.g., (1) an embodiment in which an optical function 26 is connected to the large mode size waveguide 22, or (2) an embodiment in which the optical function 26 is an optical waveguide function that resides within the large mode size waveguide 22. In both cases and throughout this specification, at least one optical function 26 is performed within a large mode size waveguide, whether that large mode size waveguide 22 is explicitly separate from the optical function 26 or is integrated with the optical function 26. An optical function 26 is generally any structure or device that is used to generate, modify, and/or measure the amplitude, frequency, wavelength, dispersion, timing, propagation direction, and/or polarization properties of one or more light pulses. Optical functions 26 can include splitters, couplers, modulators, switches, filters, isolators, detectors, amplifiers, interference device, Multi-Mode Interferometer, Mach-Zehnder Interferometer, arrayed waveguide grating, switch, MEMS device, lasers, detectors, micro-resonators, polarization rotator, dispersion compensation device, polarization compensation device, polarization splitter, phase delay lines, and time delay lines. A single optical function 26, therefore, is a structure that performs at least one function, such as those listed above. The optical function or functions 26 can be chosen for a wide variety of applications. In addition, the optical functions 26 can be integrated with electrical functions and electro-optical functions on a single substrate 20. If a single optical chip contains multiple optical or electro-optical functions 26, low minimum bending radius waveguides 24 can be used to interconnect these optical or electro-optical functions 26.

Figure 3A:
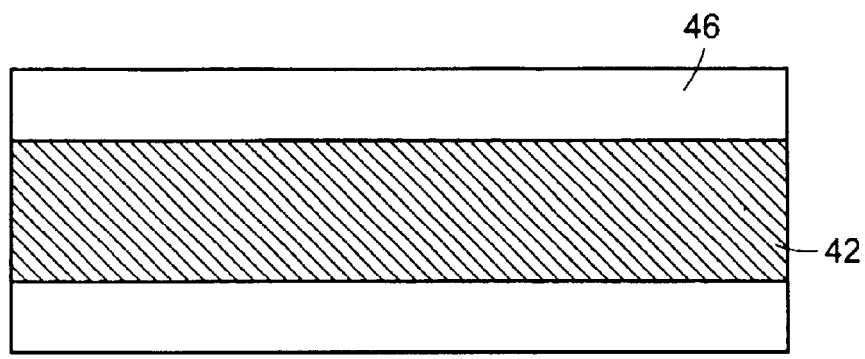
FIG. 3a is a side view of a large mode field size dielectric channel waveguide.
Figure 3B:
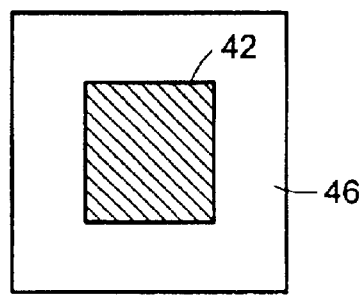
Figure 4A:
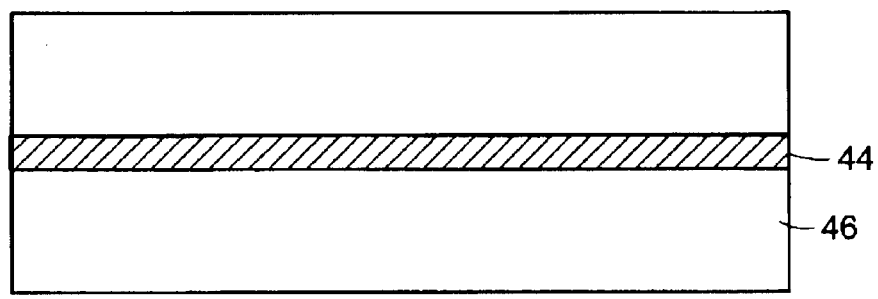
FIG. 4a is a side view of a low minimum bending radius dielectric channel waveguide.
Figure 4B:
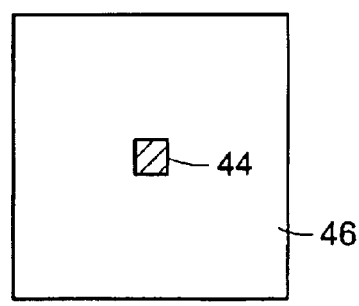

The large mode field size waveguide 22 can, in one embodiment, be a low index difference waveguide that is a channel waveguide, although in other embodiments other types of waveguides can be used as the large mode field size waveguide 22. Generally, the large mode field size waveguide 22 has a mode field size similar to that of external optical fiber, which is a low index difference waveguide. The low minimum bending radius waveguide 24 can, in one embodiment, be a high index difference waveguide. The low index difference waveguides, when used, include a core material 42 having an index of refraction $n_1$ and a cladding material 46 having an index of refraction $n_3$. FIG. 3a shows a side view of a typical low index difference waveguide, and FIG. 3b shows a cross-sectional view of the low index difference waveguide of FIG. 3a. Similarly, the high index difference waveguide, when used, includes a core material 44 having an index of refraction $n_2$ and a cladding material 46 having an index of refraction $n_3$. FIG. 4a shows a side view of a typical high index difference waveguide, and FIG. 4b shows a cross-sectional view of the high index difference waveguide of FIG. 4a. The index of refraction $n_3$ of the cladding material 46 is less than the index of refraction $n_1$ of the low index core material 42, which is less than the index of refraction $n_2$ of the high index core material 44.

In the embodiment of FIGS. 3a, 3b, 4a, 4b, the low index difference waveguides and the high index difference waveguides both have the same cladding material 46 surrounding their cores 42, 44, although in other embodiments different cladding materials can be used. As used throughout this specification, a low index difference waveguide is a waveguide where delta ($\Delta$) for the index of refraction $n_1$ of the core material 42 and the index of refraction $n_3$ of the cladding material 46 is generally very small, such as less than 0.1 (10 percent). In other words:

$$\Delta = (n_1 - n_3)/n_3 < 0.1.$$

In some embodiments, this index difference $\Delta n$ is such that $\Delta$ is less than 0.01 (1 percent) or less than 0.04 (4 percent).

A high index difference waveguide, on the other hand, is a waveguide where delta ($\Delta$) for the index of refraction $n_2$ of the core material 44 and the index of refraction $n_3$ of the cladding material 46 is at least 0.1. In other words:

$$\Delta = (n_2 - n_3)/n_3 \geq 0.1.$$

In other embodiments, the index difference $\Delta n$ is such that $\Delta$ for a high index difference waveguide is at least 0.2, and for still other embodiments, $\Delta$ is at least 0.3.

If a low index difference waveguide is used as the large mode size waveguide 22 for an input/output port, the index of refraction $n_1$ of the core material 42 and the index of refraction $n_3$ of the cladding material 46 are chosen so that the low index difference waveguide 22 has an effective index of refraction and mode size close to that of the external optical fiber 28. The external optical fiber 28, much like a low index difference waveguide, includes a core material surrounded by a cladding material. The core material of the optical fiber 28 can have a square, rectangular, elliptical, or circular cross-section or, in other embodiments, an arbitrary cross-section can be used. In one embodiment, the same geometry and indices of refraction can be chosen for the low index difference waveguide on the substrate 20 as are used for the external optical fiber 28. The coupling loss between the external optical fiber 28 and the low index difference waveguide 22 is minimized by matching the mode size of the low index difference waveguide to that of the external optical fiber 28. In addition, reflection is minimized by matching the effective index of refraction of the low index difference waveguide to that of the external optical fiber 28. Both of the large mode size waveguides 22 of FIG. 2 are used for input/output ports. In other embodiments, such as that shown in FIG. 5, some large mode field size waveguides 22 are not input/output ports, but instead are connected to or contain optical functions. These large mode field size waveguides 22 that are not used for input/output, do not need to have mode sizes to match external fiber; instead, these large mode size waveguides 22 can have differing mode sizes chosen for particular optical functions. A mode transformer can be used to alter mode sizes for these large mode size waveguides.

In one embodiment where low index difference waveguides are used, the indices of refraction $n_1$, $n_3$ of the low index core 42 and the cladding material 46 are chosen so that the low index difference waveguide has a mode field 1/e diameter size of at least 2 microns. The mode field 1/e diameter (the mode size) is the diameter of the mode where the optical field amplitude is 1/e of the peak optical field amplitude. In this embodiment, the core material 42 and the cladding material 46 are chosen to make the mode field 1/e diameter size large enough to maximize the coupling throughput and error tolerance with the external optical fiber 28.

To design a waveguide by mode size, the following procedure can be used. For a particular selection of refractive indices $n_1$, $n_3$ and for a certain wavelength of light that will propagate through the waveguide, the dimensions of the waveguide can be selected to be less than or equal to the single mode cut-off dimension, and this dimension determines the mode size. The lower limit of the mode field 1/e diameter size of about 2 microns, therefore, ensures that the mode field 1/e diameter size of the low index difference waveguide, when used, will remain large enough to effectively couple to external optical fibers 28. In other embodiments, this lower limit of the mode field 1/e diameter can be about 3 microns or, in still other embodiments, 5 microns. Typical optical fiber waveguides have mode field 1/e diameter sizes of about 8–10 microns. In one embodiment, therefore, the low index difference waveguide 22 can have a mode field 1/e diameter size of about 8–10 microns. An upper range of the mode field 1/e diameter size of the low index difference waveguide 22 can be the largest mode field 1/e diameter size typically used for external optical fibers 28. In one embodiment, such an upper range for the mode field 1/e diameter size can be about 15–20 microns, although this upper mode field 1/e diameter size can vary widely.

Throughout this specification, a large mode field size waveguide (or large mode size waveguide) is a waveguide that has a mode field 1/e area similar to that of a waveguide having a mode field 1/e diameter of at least 2 microns. In such an embodiment, for instance, the mode field 1/e area would be $\pi$ square microns. Similarly, in an embodiment where the mode field 1/e diameter is 3 microns, the mode field 1/e area would be about 2.25 $\pi$ square microns. More particularly, a large mode field size waveguide could have a mode field 1/e area of about $16\pi$ square microns (for an 8 micron mode field 1/e diameter) or $25\pi$ square microns (for a 10 micron mode field 1/e diameter). Such a large mode field size waveguide having an 8–10 micron diameter can include optical fiber. A large mode field size waveguide can be a waveguide of any configuration, including but not limited to a channel waveguide.

In one embodiment, as mentioned above, the large mode field size waveguide 22 on the substrate 20 can be a low index difference waveguide 22. The low index difference waveguide 22 can have a core material 42 made from doped silica and a cladding material 46 made from silica. If the low index difference waveguide 22 is used for an input/output port for the optical chip, a blunt connection or coupler of any variety can be used to connect the external optical fiber 28 to the low index difference waveguide 22 on the substrate 20. For instance, an end of the optical fiber 28 can be abutted to an end of the low index difference waveguide 22, and these two ends can be adhered together. Because the material and design of the low index difference waveguide 22 can be chosen to match the external optical fiber 28, a low coupling loss, such as about 1 decibel (dB) or less, can result between the external optical fiber 28 and the low index difference waveguide 22. The external optical fiber 28 shown in FIG. 2 can be replaced by any low index difference waveguide, and not only the optical fiber 28 shown in the Figures. The external optical fiber 28 could therefore represent an input or output from another optical chip on a substrate or could be any other optical device.

The low minimum bending radius waveguide 24 allows for the miniaturization of optical functions 26 on the substrate 20. A small optical chip with a large number of optical functions 26 can therefore result. Because low minimum bending radius waveguides have smaller bending radii than large mode size waveguides and low index difference waveguides, optical functions 26 and bending and splitting of propagating light can be implemented in smaller areas using these low minimum bending radius waveguides. A "minimum bending radius" can be defined as the radius for a 90 degree bend in which the loss during the bend is less than or equal to a certain amount, such as 0.5 dB in one embodiment. In other embodiments, a minimum bending radius can be for a loss of less than or equal to 0.1 dB in a 90 degree turn or, in still other embodiments, a loss of less than or equal to 0.01 dB in a 90 degree turn. Throughout this specification, the term "low minimum bending radius" will be used to refer to a radius of less than or equal to 50 microns for a 90 degree bend in which the loss during the bend is less than or equal to 0.5 dB. As an example, the minimum bending radius for a high index difference waveguide having a delta (Δ) of 0.3, $n_{cladding}$ of 1.5, and having a 1 micron by 1 micron core dimension can be less than or equal to 50 microns and, in other embodiments, less than or equal to 20 microns, and in still other embodiments, less than or equal to 10 microns. Such a waveguide is a low minimum bending radius waveguide. As another example, the minimum bending radius for a low index difference waveguide where Δ is 0.01, $n_{cladding}$ is 1.5, and having a 10 micron by 10 micron core dimension is on the order of 1 cm. Such a waveguide is not a low minimum bending radius waveguide.

The use of low minimum bending radius waveguides on the optical chip allows for the integration of a large number of optical functions 26 on a single substrate 20. The optical functions 26 and low minimum bending radius waveguides 24 on the substrate 20 communicate with external optical fibers 28, chips, or optical devices through at least one of the large mode field size waveguides 22 on the substrate 20. As noted above, at least some of the optical functions are performed in large mode size waveguides. As such, the portions of light paths in large mode field size waveguides 22 will require greater space than portions in low minimum bending radius waveguides 24. It is, however, desirable to perform certain optical functions in large mode field size waveguides 24. The use of low minimum bending radius waveguides 24 for bends and/or splits, however, still allows for miniaturization of the optical chip, even though large mode field size waveguides 22 are used for at least one optical function. In some embodiments (not shown), certain optical functions on the optical chips can be performed in low minimum bending radius waveguides 24 and other optical functions can be performed in the large mode field size waveguides 22.

Figure 5:
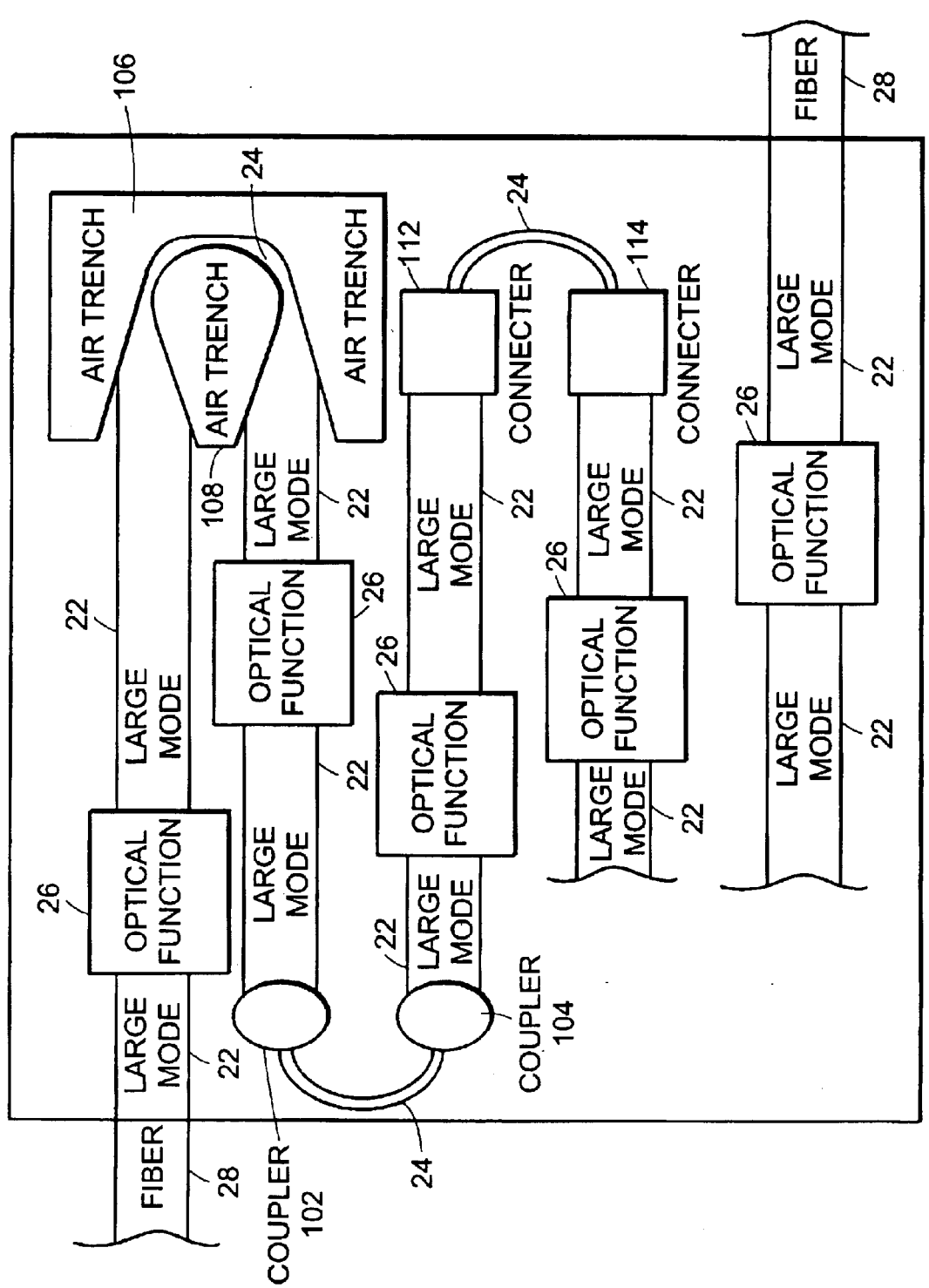
FIG. 5 is a block diagram of an optical chip according to a second embodiment of the invention.

In some embodiments of the invention, a single optical function can be split into multiple pieces, with the pieces separated by low minimum bending radius waveguides. A single optical function that requires a long length can therefore be performed in multiple segments separated by bends. An amplifier is one exemplary optical function that can be split into multiple pieces separated by bends. Referring to FIG. 5, each of the five optical functions 26 shown could be pieces of a single optical function in this embodiment. A modulator is another optical function that can be realized in this embodiment.

Referring again to FIG. 2, the optical chip can contain more than one input or output low index difference waveguides 22. In FIG. 2, for instance, a first low index difference waveguide 22 provides for a first input/output port from the optical chip, and a second low index difference waveguide 22 provides for a second input/output port from the optical chip. The particular design of the optical chip depends on the application for which the optical chip will be used.

The optical chip of FIG. 2 need not be connected to an external optical fiber 28. Instead, an optical connection can be made between one of the large mode field size waveguides 22 on the substrate 20 and an external chip (not shown in Figures) rather than an external optical fiber 28. The large mode field size waveguide 22 on substrate 20 can therefore directly connect to an external chip or to an external optical fiber 28. A large mode field size waveguide on an external chip can be used to couple with the large mode size waveguide 22 on the substrate 20. In another embodiment, an emitting/receiving function on the external chip can be optically connected to the large mode field size waveguide 22 on the substrate 20.

In operation of the embodiment of FIG. 2, light pulses enter the optical chip through the optical fiber 28 on the left hand side of the figure. An optical function can then be performed in the large mode field size waveguide 22 on the optical chip. Bending with low loss can then be achieved in the low minimum bending radius waveguide 24. Eventually, the light pulse can exit the optical chip through the large mode field size waveguide 22 to the optical fiber 28 on the right hand side of FIG. 2. It should be noted that the optical path can be bi-directional, and can therefore be the reverse of that described above. In addition, some optical chips might not contain both inputs and outputs.

FIG. 5 depicts a second embodiment of an optical chip according to the invention. In this embodiment, it is clear that the low minimum bending radius waveguides 24 are used for bends in the light path and that a large number of optical functions 26 can be implemented in the large mode field size waveguides 22. Five optical functions 26 are shown in the embodiment of FIG. 5, and the cut-out portion indicates that a large additional number of optical functions 26 and bends can be included. As will be discussed in greater detail below, FIG. 5 also illustrates different types of couplers that can be used in accordance with the invention.

The optical chips described above can also be part of a larger subsystem. For instance, such a subsystem could include one of the optical chips described above connected to an external large mode field size dielectric waveguide. The optical chip in such an embodiment could include a low minimum bending radius waveguide used for a bend and/or split, a large mode field size waveguide, and an optical function connected to the large mode field size waveguide. The external large mode field size dielectric waveguide, in this embodiment, would be external to the optical chip and would be optically coupled to the large mode field size waveguide on the optical chip. Such a subsystem including an optical chip and an external large mode field size dielectric waveguide, one example of which can be a module, could be used in a number of applications, including those described below.

The optical chips described above can be used for a variety of applications, including passive or active applications. In one embodiment, the optical chips described above can be used for amplification functions. For some amplifiers, it is desirable to amplify in large mode field size waveguides. The length of waveguide required for some amplification functions, however, is large. For example, some amplifiers can require up to 10 meter waveguide lengths for proper amplification. If the amplifier is broken up into pieces and each piece is used as an optical function in the embodiments above, the footprint of the optical chip containing such an amplifier can be reduced and the shape of the chip can be changed. Because low minimum bending radius waveguides are used for bends between the amplifier optical functions, little space is required for waveguide bends. Although a significant waveguide length can still be required for proper amplification, pieces of this waveguide length can be tightly integrated on the optical chip through the use of the low minimum bending radius waveguides.

A compact modulator can also be built based on the optical chip described above. Large mode size waveguides based on Lithium Niobate are typically used for light modulation. Titanium doping is used to define the core in a Lithium Niobate substrate. The index difference between the core (Titanium doped Lithium Niobate) and the cladding (Lithium Niobate) is small, which makes the waveguide a large mode size waveguide with a large minimum bending radius. For a useful modulation function based on this technology, a long waveguide length can be helpful. If the modulator is broken up into pieces and each piece is used as an optical function in the embodiments above, the footprint of the optical chip containing such a modulator can be reduced. Because low minimum bending radius waveguides are used for bends between the modulator optical functions, little space is required for waveguide bends. Although a significant waveguide length can still be required for proper modulation, pieces of this waveguide length can be tightly integrated on the optical chip through the use of the low minimum bending radius waveguides. Several embodiments of modulators, especially those which change phase modulation into amplitude modulation of the optical signal (e.g. Mach Zehnder), have extremely long interconnection pathways. These long pathways are a result of the use of large mode size waveguides to perform the splitting and routing functions. Low minimum bending radius waveguides can be used to perform the splitting and routing functions to reduce the footprint of the optical chip.

Another application of the optical chips described above can be in cross-connects. In cross-connect applications, it can be difficult to cross light without interference in high index difference waveguides. It can therefore be desirable to perform cross-connecting functions in large mode field size waveguides. The integration of a cross-connect network on an optical chip can be decreased in size by using low minimum bending radius waveguides for bends and/or splits. As such, the resulting optical chip can perform the cross-connecting function in a relatively small footprint.

The optical chips described above can incorporate other popular current technology, such as splitters, couplers, switches, filters, isolators, detectors, interference device, Multi-Mode Interferometer, Mach-Zehnder Interferometer, arrayed waveguide grating, switch, MEMS device, lasers, detectors, micro-resonators, polarization rotator, dispersion compensation device, polarization compensation device, polarization splitter, phase delay lines, and time delay lines as basic building blocks of functionality. Together with other devices, subsystems on a single optical chip, including both passive and action applications, can be implemented.

As described above, the substrate 20 contains at least one large mode size waveguide 22 and at least one low minimum bending radius waveguide 24. In order to use a low minimum bending radius waveguide 24, the mode of the light can be transformed from the mode of the large mode field size waveguide 22 and the low index difference optical waveguide function 26 to that of the low minimum bending radius waveguide 24. To accomplish this mode transformation, a number of devices can be used. In one embodiment, a coupler, mode transformer, or optical connector can be used to optically connect the low minimum bending radius waveguide 24 to the large mode field size waveguide 22 used for the optical function 26. Two waveguides are "coupled" or "optically connected" if a change in one or more of the properties of an optical signal in one waveguide affects the properties of the optical signal in the second waveguide without an intermediate conversion to an electrical signal. Many optical couplers can be used in accordance with the invention. One such optical coupler is described in U.S. Pat. No. 6,253,015 to Ukrainczyk et al. FIG. 5 generally labels with numbers 112, 114 connectors that can be used to connect large mode field size waveguides 22 to low minimum bending radius waveguides 24.

Generally, it can be desirable to have the lowest possible loss in optical signal in the coupler between a first waveguide and a second waveguide. This coupling loss, for instance, can be about 1 decibel or less for an efficient coupler. For coupling of waveguides having similar mode sizes and refractive indices, simple coupling methods, such as abutting an end of one waveguide to an end of the other waveguide, can be used. When the mode sizes of waveguides differ, however, more complex couplers can be used.

One coupler that can be used is described in International Publication Number WO 02/05000, published Jan. 17, 2002, by Lee et al., and entitled "Mode Transformer Between Low Index Difference Waveguide and High Index Difference Waveguide." This publication describes a mode transformer that enables low-loss coupling between optical modes of two waveguides with different index differences. Such a coupler can be used at both ends of the low minimum bending radius waveguide 24 so that the mode is coupled from the large mode field size waveguide 22 to the low minimum bending radius waveguide 24 with a first coupler, and then the mode is transformed from the low minimum bending radius waveguide 24 to the large mode field size waveguide 22 with a second coupler. FIG. 5, for instance, shows two couplers 102, 104 attached at ends of a low minimum bending radius waveguide 24 used for a bend.

Figure 6:
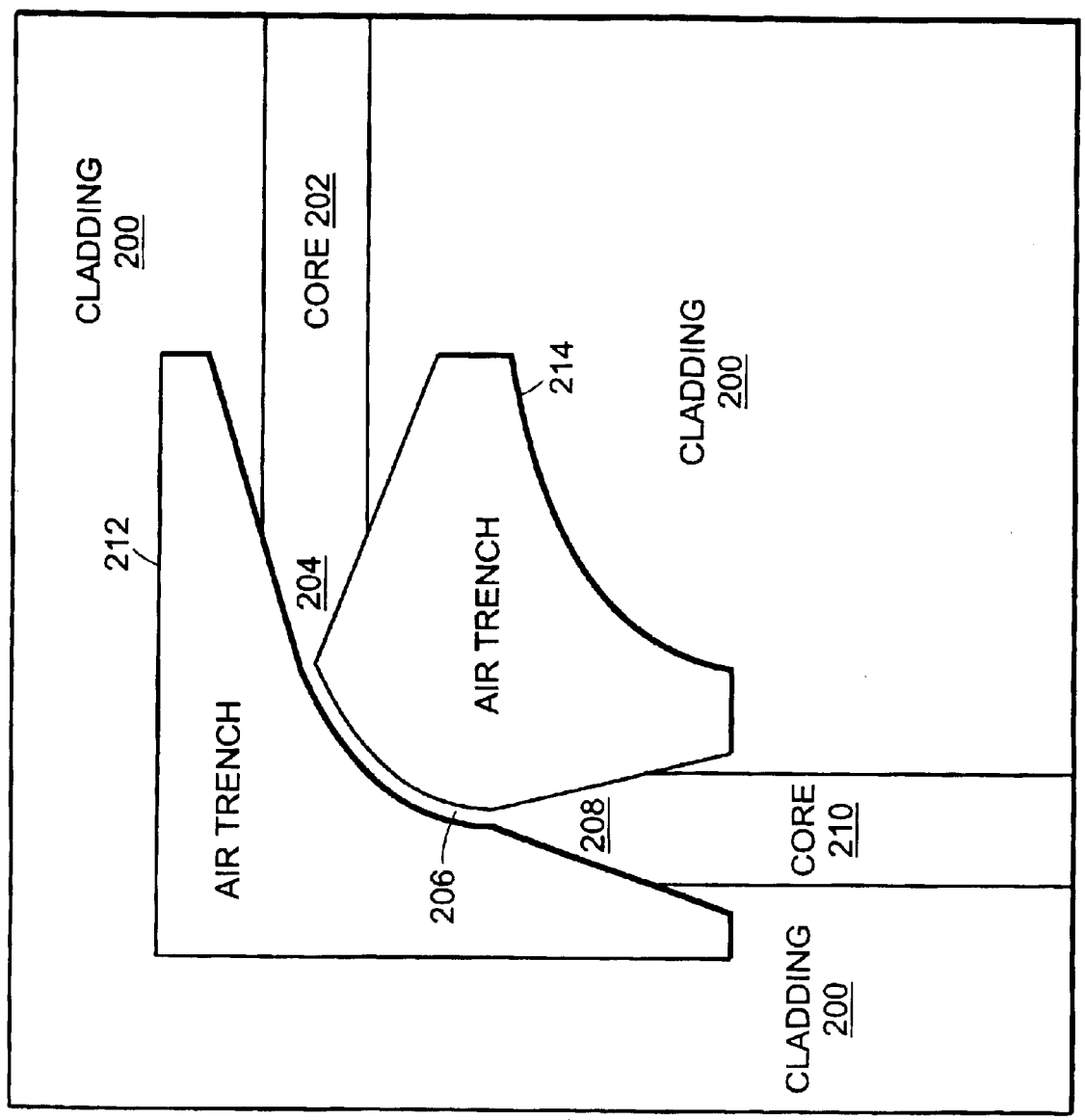
FIG. 6 is a block diagram of an embodiment that can be used for bends in waveguides according to one aspect of the invention.

In another embodiment, mode transformation and small bending radii can be achieved using tapered air trenches. FIG. 6 depicts such a tapered air trench approach. In such an approach, the core 202 of the waveguide is surrounded by cladding 200 at a first location. As the waveguide approaches the bend, the core tapers, as indicated by tapered portion 204. As the core 202 tapers, air trenches 212, 214 are introduced around the tapered portion 204. The air has a lower index of refraction than the cladding 200. The core 202, which has been narrowed by the tapered portion 204, therefore becomes part of a waveguide with a higher index difference than the untapered core 202 surrounded by the cladding 200. After a bend in the waveguide, a similarly tapered portion 208 surrounded by the air trenches 212, 214 forms the core 210 of a large mode size waveguide. The air trench approach of FIG. 6, therefore, alters a large mode size waveguide to a low minimum bending radius waveguide and then back to a large mode size waveguide after a bend. FIG. 5 also shows tapered air trenches 106, 108 between two large mode field size waveguides that are used to achieve a low minimum bending radius waveguide between the two large mode field size waveguides.

Any references to front and back, right and left, top and bottom, upper and lower, and horizontal and vertical are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. An optical chip, comprising:
    a first large mode field size dielectric waveguide to interface with an external optical device;
    at least one low minimum bending radius dielectric waveguide having a first end coupled to the first large mode field size dielectric waveguide, the low minimum bending radius dielectric waveguide being used for one or more of a bend and a split of a light path;

a second large mode field size dielectric waveguide coupled to a second end of the low minimum bending radius dielectric waveguide; and at least one optical function connected to one or more of the first large mode field size dielectric waveguide and the second large mode field size dielectric waveguide; wherein the optical function is split into at least two pieces, with the at least two pieces separated by the low minimum bending radius waveguide;

wherein the first large mode field size dielectric waveguide, the second large mode field size dielectric waveguide, the low minimum bending radius dielectric waveguide, and the optical function are fabricated monolithically on a single substrate.

2. The optical chip of claim 1, wherein the optical function is any structure that performs at least one of generating, modifying, and measuring at least one of the amplitude, frequency, wavelength, dispersion, timing, propagation direction, and polarization properties of one or more light pulses.

3. The optical chip of claim 1, wherein the optical function is an amplifier.

4. The optical chip of claim 1, wherein the optical function is a cross-connect.

5. The optical chip of claim 1, wherein the optical function is a modulator.

6. The optical chip of claim 1, wherein the external optical device is a fiber optic waveguide.

7. The optical chip of claim 1, wherein the first and second large mode field size dielectric waveguides are low index difference dielectric waveguides, and wherein the low minimum bending radius dielectric waveguide is a high index difference dielectric waveguide.

8. The optical chip of claim 7, wherein the low index difference dielectric waveguide includes a low index core and a cladding, wherein the index of refraction $n_1$ of the low index core and the index of refraction $n_3$ of the cladding are related as follows: $0 < [(n1-n3)/n3] < 0.1$.

9. The optical chip of claim 8, wherein the high index difference dielectric waveguide includes a high index core and the cladding, wherein the index of refraction $n2$ of the high index core and the index of refraction $n3$ of the cladding are related as follows: $0.1 <= [(n2-n3)/n3]$.

10. The optical chip of claim 1, wherein the optical function is fabricated within one or more of the first large mode field size dielectric waveguide and the second large mode field size dielectric waveguide.

11. An optical chip having at least one light path from an input to the optical chip to an output from the optical chip, comprising:

at least one low minimum bending radius dielectric waveguide, the low minimum bending radius dielectric waveguide being used for one or more of a bend and a split in the light path;

a large mode field size dielectric waveguide coupled to an end of the low minimum bending radius dielectric waveguide; and at least one optical function connected to or in the large mode field size dielectric waveguide, wherein the optical function is split into at least two pieces, with the at least two pieces separated by the low minimum bending radius waveguide; and wherein the large mode field size dielectric waveguide, the low minimum bending radius dielectric waveguide, and the optical function are fabricated monolithically on a single substrate.

12. An optical chip, comprising:

a first large mode field size dielectric waveguide to interface with an external optical device, the first large mode field size dielectric waveguide having a first optical function;

at least one low minimum bending radius dielectric waveguide coupled to the first large mode field size dielectric waveguide, the low minimum bending radius dielectric waveguide being used for one or more of a bend and a split of a light path;

wherein the first large mode field size dielectric waveguide, the first optical function, and the low minimum bending radius dielectric waveguide are fabricated monolithically on a single substrate; and wherein the optical function is split into at least two pieces, with the at least two pieces separated by the low minimum bending radius waveguide.

13. The optical chip of claim 12, wherein the first large mode field size dielectric waveguide is coupled to a first end of the low minimum bending radius dielectric waveguide, and further comprising:

a second large mode field size dielectric waveguide coupled to a second end of the low minimum bending radius dielectric waveguide, the second large mode field size dielectric waveguide having a second optical function.

14. The optical chip of claim 12, wherein the first optical function is any structure that performs at least one of generating, modifying, and measuring at least one of the amplitude, frequency, wavelength, dispersion, timing, propagation direction, and polarization properties of one or more light pulses.

15. The optical chip of claim 12, wherein the first optical function is an amplifier.

16. The optical chip of claim 12, wherein the first optical function is a cross-connect.

17. The optical chip of claim 12, wherein the first optical function is a modulator.

18. The optical chip of claim 12, wherein the external optical device is a fiber optic waveguide.

19. An optical chip, comprising:

a plurality of large mode field size dielectric waveguides, at least one of the large mode field size dielectric waveguides being used to interface with an external optical device;

a plurality of low minimum bending radius dielectric waveguides, each of the low minimum bending radius dielectric waveguides being used to interconnect two or more of the large mode field size dielectric waveguides; and one or more optical functions connected to or in one or more of the large mode field size dielectric waveguides, wherein at least one of the optical function is split into at least two pieces, with the at least two pieces separated by the low minimum bending radius waveguide; and wherein the large mode field size dielectric waveguides, the low minimum bending radius dielectric waveguides, and the optical functions are fabricated monolithically on a single substrate.

20. The optical chip of claim 19, wherein the optical functions are any structures that perform at least one of generating, modifying, and measuring at least one of the amplitude, frequency, wavelength, dispersion, timing, propagation direction, and polarization properties of one or more light pulses.

21. The optical chip of claim 19, wherein the optical functions are amplifiers.

22. The optical chip of claim 19, wherein the optical functions are cross-connects.

23. The optical chip of claim 19, wherein the optical functions are modulators.

24. The optical chip of claim 19, wherein the external optical device is a fiber optic waveguide.

25. An optical chip, comprising:
at least one optical function that includes at least one large mode field size dielectric waveguide;
a first low minimum bending radius dielectric waveguides optically connected to the first end of the optical function;
a second low minimum bending radius dielectric waveguide optically connected to the second end of the optical function;
wherein the large mode field size dielectric waveguide, the first low minimum bending radius dielectric waveguide, and the second low minimum bending radius dielectric waveguide are fabricated monolithically on a single substrate; and
wherein the optical function is split into at least two pieces, with the at least two pieces separated by the low minimum bending radius waveguide.

26. The optical chip of claim 25, wherein the optical function is any structure that performs at least one of generating, modifying, and measuring at least one of the amplitude, frequency, wavelength, dispersion, timing, propagation direction, and polarization properties of one or more light pulses.

27. The optical chip of claim 25, wherein the optical function is an amplifier.

28. The optical chip of claim 25, wherein the optical function is a cross-connect.

29. The optical chip of claim 25, wherein the optical function is a modulator.

30. An optical chip, comprising:
a first large mode size waveguide connected to the first end of an optical function;
a second large mode size waveguide connected to the second end of the optical function;
a first low minimum bending radius dielectric waveguides coupled to the first large mode field size dielectric waveguide;
a second minimum bending radius dielectric waveguide coupled to the second large mode field size dielectric waveguide;
wherein the first large mode field size dielectric waveguide, the second large mode field size dielectric waveguide, the first low minimum bending radius dielectric waveguide, and the second low minimum bending radius dielectric waveguide are fabricated monolithically on a single substrate; and
wherein the optical function is split into at least two pieces, with the at least two pieces separated by the low minimum bending radius waveguide.

31. The optical chip of claim 30, wherein the optical function is any structure that performs at least one of generating, modifying, and measuring at least one of the amplitude, frequency, wavelength, dispersion, timing, propagation direction, and polarization properties of one or more light pulses.

32. The optical chip of claim 30, wherein the optical function is an amplifier.

33. The optical chip of claim 30, wherein the optical function is a cross-connect.

34. The optical chip of claim 30, wherein the optical function is a modulator.

35. An optical chip, comprising:
a large mode field size waveguide having a first end for optical connection to an external optical device; and
an optical function optically connected to a second end of the large mode field size waveguide, wherein the optical function is split into at least two pieces, with the at least two pieces separated by a low minimum bending radius waveguide having a bend;
wherein the large mode field size waveguide, the optical function, and the low minimum bending radius waveguide are fabricated monolithically on a single substrate.

36. The optical chip of claim 35, wherein the optical function is a single optical function to perform a discrete function.

37. The optical chip of claim 36, wherein the optical function is any structure that performs one of generating, modifying, and measuring at least one of the amplitude, frequency, wavelength, dispersion, timing, propagation direction, and polarization properties of one or more light pulses.

38. An optical chip, comprising:
a single optical function broken into a plurality of sections, wherein adjacent sections of the optical function are connected by low minimum bending radius waveguides having bends; and
a large mode field size waveguide for connection to an external optical device, the large mode field size waveguide being optically connected to the single optical function, wherein the large mode field size waveguide, the single optical function, and the low minimum bending radius waveguides are fabricated monolithically on a single substrate.

39. The optical chip of claim 38, wherein the optical function is any structure that performs one of generating, modifying, and measuring at least one of the amplitude, frequency, wavelength, dispersion, timing, propagation direction, and polarization properties of one or more light pulses.

* * * * *